United States Patent
Silva Garcia et al.

(10) Patent No.: US 10,087,346 B2
(45) Date of Patent: Oct. 2, 2018

(54) DISPERSION OF HOMOPOLYMER OF VINYL CHLORIDE

(71) Applicant: MAGINK COMÉRICO DE IMAGEM GRÁFICA LTDA.—ME, Sao Paulo, SP (BR)

(72) Inventors: Carlos Julio Silva Garcia, Sao Paulo (BR); Leon Dario Silva Garcia, Sao Paulo (BR)

(73) Assignee: MAGINK COMÉRICO IMAGEM GRÁFICA LTDA.—ME, São Paulo, SP (BR)

( * ) Notice: Subject to any disclaimer, the term of this patent is extended or adjusted under 35 U.S.C. 154(b) by 0 days.

(21) Appl. No.: 15/310,562

(22) PCT Filed: May 13, 2014

(86) PCT No.: PCT/IB2014/061404
§ 371 (c)(1),
(2) Date: Nov. 11, 2016

(87) PCT Pub. No.: WO2015/173608
PCT Pub. Date: Nov. 19, 2015

(65) Prior Publication Data
US 2017/0096587 A1    Apr. 6, 2017

(51) Int. Cl.
C08J 3/18        (2006.01)
C09J 127/06      (2006.01)
C08K 5/00        (2006.01)
C08K 5/11        (2006.01)
C08K 5/06        (2006.01)

(52) U.S. Cl.
CPC ............... C09J 127/06 (2013.01); C08J 3/18 (2013.01); C08J 2327/06 (2013.01); C08K 5/0016 (2013.01); C08K 5/06 (2013.01); C08K 5/11 (2013.01)

(58) Field of Classification Search
CPC ........ C08J 127/06; C08J 3/18; C08J 2327/06; C08K 5/11; C08K 5/0016; C08K 5/06
See application file for complete search history.

(56) References Cited

U.S. PATENT DOCUMENTS

| | | | |
|---|---|---|---|
| 3,414,534 A | 12/1968 | Huitson | |
| 6,324,561 B1 | 11/2001 | Cambonie | |
| 6,441,085 B1 * | 8/2002 | Sæthre | ............. C08J 3/005 523/223 |
| 6,727,305 B1 | 4/2004 | Aranguiz | |
| 6,797,753 B2 | 9/2004 | Benecke | |
| 7,741,395 B2 | 6/2010 | Holm | |
| 2003/0139317 A1 | 7/2003 | Behler | |
| 2009/0149586 A1 | 6/2009 | De Quadros | |
| 2011/0206766 A1 | 2/2011 | Gosse | |
| 2011/0272174 A1 | 11/2011 | Chaudhary | |

FOREIGN PATENT DOCUMENTS

CN    1691895    7/2004

OTHER PUBLICATIONS

WIPO Search Report dated Oct. 21, 2014 for parent PCT application No. PCT/IB2014/061404.

* cited by examiner

*Primary Examiner* — Peter D. Mulcahy
(74) *Attorney, Agent, or Firm* — D'Ambrosio & Menon, PLLC; Usha Menon

(57) ABSTRACT

Preparation process for the dispersion of homopolymer of vinyl chloride with high content of free hydroxyl as adhesive, more precisely, the current patent comes to be the invention of the preparation process for the dispersion of homopolymer of vinyl chloride with high content of free hydroxyl as adhesive where it is used an homopolymer of vinyl chloride of high molecular weight which reacts with a vegetable plasticizer, polyarilic glycolic triester based, biodegradable and non-toxic, in order to reach a certain content of free hydroxyl controlled by the balance of a vegetable ethoxylate surfactant, thus providing, an extreme adherence over different polymeric substrates, or not, due to the high intermolecular forces 'Van Der Waals' which indicate the dimension of the action on the surface.

8 Claims, No Drawings

DISPERSION OF HOMOPOLYMER OF VINYL CHLORIDE

PRIORITY CLAIM

This patent application is the U.S National stage under U.S.C. 371 of PCT/IB2014/061404 filed May 13, 2014, and designating the United States.

FIELD OF APPLICATION

The current patent comes to be the invention of the preparation process for the dispersion of homopolymer of vinyl chloride with high content of free hydroxyl as adhesive where it is used an homopolymer of vinyl chloride of high molecular weight which reacts with a vegetable plasticizer, polyarilic glycolic triester based, biodegradable and non-toxic, in order to reach a certain content of free hydroxyl controlled by the balance of a vegetable ethoxylate surfactant, thus providing, an extreme adherence over different polymeric substrates, or not, due to the high intermolecular 'Van Der Waals' forces which indicate the dimension of the action on the surface.

FOUNDATIONS OF THE TECHNIQUE

It is known that plastisol consists of a suspension of polyvinyl chloride (PVC) particles—in a plasticizer, a solution that flows like a liquid and can be poured to a heated mold; when heat to around 177 degrees Celsius, the plastic and plasticizer get dissolved in each other. When cooling the mold to 60 degrees Celsius, the result is a flexible product, plasticized permanently.

Mentioning plastisol, as well, it is normally used as a textile dye for printing screen and, as a coating, particularly in external applications, such as roofs, furniture and dip-coating.

For serigraphy, plastisol is commonly used in the dyes to print drawings on clothes, and they are particularly useful to print opaque graphs on dark cloth.

These plastisol dyes must be cured by heating at a temperature around 180 degrees Celsius for the complete cure.

The contact adhesives, as well, known as sensitive to pressure are based on the medium acidification in order to have an excess of free hydroxyl and under the heating action to transform this adherence permanently. The terminology adhesive is based on the expression of the Adhesive Sealant Council which sets like the material that is used to bind/link that features fluidity in the moment of the application.

Such permanent adhesives are specific to substrates and they do not retrieve the adherence force under the action of pressure.

ANALYSIS OF THE STATE OF THE ART

In a survey performed in specialized database, documents relative to adhesive preparation processes were found, such as the documents #US 20080293854 and U.S. Pat. No. 4,525,234 which present a (Poly) Methacrylate based adhesives to meet the expectation of the acrylic chain action over the homopolymer in order to allow a contact action over the substrate. Thus, the stabilizers in plastisol balance the action of the intermolecular forces by controlling its attraction to the substrate plastisol, besides the necessary presence of the adherence promoters, which in addition to the environmental issues, acts on specific substrates.

Document #PI 0705826-8 refers to the process to attain the dispersion of PVC/plastisol resin with expander agent; dispersion of PVC/plastisol resin with expander agent; solid artifact including expanded plastic PVC, use of sodium bicarbonate and/or ammonium bicarbonate in the preparation of a dispersion of PVC/plastisol resin. A practical, viable and inventive solution for the utilization of expander chemical agents in plastisol and, in special, for the problem of the utilization of the expander agent with toxic characteristics or potentially toxic. The use of the expander agent proposed does not present toxic effect and it can be used even in food sealants or even in contact with food. The process to attain the dispersion of PVC/plastisol resin is from a mixture containing, as expander agent, sodium bicarbonate or ammonium bicarbonate with a specific granulometry which assures enough convenience in processes such as rotomolding, dipping, deposition, spreading and spray besides assuring the final effect desired through the perfect control of the expansion uniformity on the final product.

Document #US2011111238 refers to plastisols which, even without the addition of adherence promoters, show high adherence to metal and substrates coated by deposition/cathodically. Such process generates a system of multiple adherences through the control of the attraction forces by the action of isocyanates, which compels the action of groups for the action of urethane as an agent of attraction to the substrate, as well as its compatibility in the formation of plastisol. The action is not environmental, as well as, the odor is stressed by the action of the isocyonates.

Document #U.S. Pat. No. 4,613,639 foresees that plastisols and organosols are based on a mixture of synthetic resin finely divided with a plasticizer and they may or may not contain additional pigments, fillers, volatile organic solvents and other auxiliaries; they are prepared by a process in which a protection or emulsifying inert or reactive colloid, or a mixture of them, is added to a dispersion of synthetic resin finely divided into a plasticizing agent, the dispersion, as such, does not have a long expiration date at room temperature.

Document #U.S. Pat. No. 5,714,030 foresees and adhesive composition of plastisol type used to bond an archiver paper and end covers of an element of fuel filter for the filtration of fuel mixture of gas and methanol. The adhesive composition includes a polymer (polymer and/or copolymer of vinyl chloride) in a quantity of 100 parts, in weight, a filler in amount ranging from 50 to 250 parts per weight, of a plasticizing agent, in an amount ranging from 50 to 250 parts per weight, and phenolic resin, as an agent that provides adhesiveness, in an amount ranging from 0.5 to 20 parts.

It is confirmed that documents U.S. Pat. No. 4,613,639 and U.S. Pat. No. 5,714,030 present the concept of multiple adhesion, but both worry, specifically, about the longevity of plastisol, as well as, the formation of two layers using the action of attraction to the substrate linked to the use of methacrylates and vinyl copolymers.

INVENTION OBJECTIVES

Aiming to present improvements to the consuming market, the applicant developed a preparation process of dispersion of homopolymer of vinyl chloride with high content of free hydroxyl as adhesive.

In the current invention the PVC homopolymer is mixed to a plasticizer in order not only to reduce its viscosity, as well as, to fulfill the properties of tear resistance, by avoiding the migration on the substrate surface, resisting to high temperatures, reaching a transparent film, as well as, allowing an ionic exchange between the PVC and the plasticizer creating an excess of free hydroxyl under the action of anti-statics, in the specific case of tense active based fatty alcohol and stabilizers, when required in view of the substrate and that does not change the free hydroxyl content, balancing this exchange and, consequently, creating a field of attraction enough for a continuous adherence.

The plasticizer used in this patent has attention, specifically, to the fact of being biodegradable, non-toxic, from renewable source able to dissolve/mix the PVC homopolymer, as well as, to prove the formation of an electronic layer properly proved through tests and trials via potentiometer and electric current.

This condition is only possible when the balance through the pH of the constant medium and of the hydrophilic-lipophilic balance reaching total stability in relation to the continuous flow of the intermolecular forces between the plastisol and substrate.

The concept presented by acrylic contact adhesives is based on this interaction acting on the formation of 'cross-linking' with the microspheres and its dilution is in solvent medium.

The hydrophilic-lipophilic provides extreme adherence force and cohesion to the homopolymer, allowing the action of an electrostatic force.

The current invention allows, with or without the use of attraction metals, that different substrates leave the adherence state several times and return without losing the thermodynamic properties.

The description of the formation of free hydroxyl occurs through 'Van Der Waals Forces' mechanism having an excess of hydroxyl in the formation of stabilized plastisol, which stabilization is promoted by the tense active based on ethoxylated fatty alcohol and controlled by the pH, HLB mixture, reaction temperature of the formation of plastisol and its excess at the action on the substrate.

The risk to which the system is exposed to be the formation of water molecules, lack of control of pH and HLB, such factors are essential to the film formation, its resistance, its degree of attraction and its temperature control.

The current invention is based on the formation of transparent film on the polymeric substrate or not, natural or not, aiming that the plastisol gets balanced, acts electronically and has continuous adherence action when removed from its contact.

DETAILED DESCRIPTION OF THE INVENTION

Concerning the drawings illustrated, the current invention patent refers to a "PREPARATION PROCESS FOR THE DISPERSION OF HOMOPOLYMER OF VINYL CHLORIDE WITH HIGH CONTENT OF FREE HYDROXYL AS ADHESIVE".

According to the current invention, the preparation process for the dispersion of homopolymer of vinyl chloride with high content of free hydroxyl as adhesive uses an homopolymer of vinyl chloride of high molecular weight which reacts with a vegetable plasticizer, polyarilic glycolic triester based, biodegradable and non-toxic, in order to reach a certain content of free hydroxyl controlled by the balance of a vegetable ethoxylate surfactant thus providing an extreme adherence over different polymeric substrates, or not, due to the high intermolecular 'Van Der Wools' forces which indicate the dimension of the action on the surface.

For the preparation of the dispersion the following components are necessary:
i) PVC homopolymer with K in the range from 65 to 75, having as reference the standard DIN 53726, 25 to 35 parts;
ii) Ethoxylate fatty alcohol—number of mols from 10 to 40 mols, 40 to 50 parts; hereafter referred to as tense active acting in the stability
iii) Ecologic plasticizer 10 to 20 parts; along with the active tense balances, stabilizes and generates anti-static action
iv) Stabilizer 1 to 2 parts.

The preparation foresees the following stages:
a) Incorporation of plasticizer on the homopolymer;
b) Incorporation of the anti-static obtaining an homogeneous solution by keeping the PH in the range from 6 to 8; that along with the ecological plasticizer stabilizes and acts as an anti-static
c) Then, the stabilizer reaches an HLB 8-10.

Such dispersion can be applied to different substrates, such as:

Vinyl laminates

It is incorporated 90 g of dispersion on a liner of the polyester type with a surface treated with mold release in order to be presented flat and with no form of dirtiness. The caliber of this application varies from 2 to 24. Through the process called spreading or calendering, the temperature is kept between 160 and 200° C. with a speed from 30 to 60 m/min reaching a solid, transparent and bright mixture under the form of a film. This film produced by the dispersion through the transference by pressure is applied on the vinyl substrate. The film thickness may vary from 12 to 100 microns. The liner is not considered. The end product obtained includes vinyl substrate with a transparent film on its surface with highest adherence ability due to its high electronic level of attraction.

Polyester substrate

It is incorporated 90 g of dispersion on a liner of the polyester type with a surface treated with mold release in order to be presented flat and with no form of dirtiness. The caliber of this application varies from 2 to 24. Through the process called spreading or calendering, the temperature is kept between 160° and 200° C. with a speed from 30 to 60 m/min reaching a solid, transparent and bright mixture under the form of a film. This film produced by the dispersion through the transference by pressure is applied on the polyester substrate.

High/low grammage paper substrate

It is incorporated 90 g of dispersion on a liner of the polyester type with a surface treated with mold release in order to be presented completely flat and with no form of dirtiness. The caliber of this application varies from 2 to 24. Through the process called spreading or calendering, the temperature is kept between 160 and 200° C. with a speed from 30 to 60 m/min reaching a solid, transparent and bright mixture under the form of a film. This film produced by the dispersion through the transference by pressure is applied on the substrate of paper with grammage between 60-240 grams.

Natural cloth or mixed fiber substrate

It is incorporated 90 g of dispersion on a liner of the polyester type with a surface treated with mold release in order to be presented completely flat and with no form of dirtiness. The caliber of this application varies from 2 to 24. Through the process called spreading or calendering, the temperature is kept between 160 and 200° C. with a speed from 30 to 60 m/min reaching a solid, transparent and bright mixture under the form of a film. This film produced by the dispersion through the transference by pressure is applied on the cloth substrate.

Polyethylene substrate

It is incorporated 90 g of dispersion on a liner of the polyester type with a surface treated with mold release in order to be presented completely flat and with no form of dirtiness. The caliber of this application varies from 2 to 24. Through the process called spreading or calendering, the temperature is kept between 160 and 200° C. with a speed from 30 to 60 m/min reaching a solid, transparent and bright mixture under the form of a film. This film produced by the dispersion through the transference by pressure is applied on the polyethylene substrate.

Polypropylene substrate

It is incorporated 90 g of dispersion on a liner of the polyester type with a surface treated with mold release in order to be presented completely flat and with no form of dirtiness. The caliber of this application varies from 12 to 100. Through the process called spreading or calendering, the temperature is kept between 160 and 200° C. with a speed from 30 to 60 m/min reaching a solid, transparent and bright mixture under the form of a film. This film produced by the dispersion through the transference by pressure is applied on the polypropylene substrate generating a solidified mixture.

Aramid substrate

It is incorporated 90 g of dispersion on a liner of the polyester type with a surface treated with mold release in order to be presented completely flat and with no form of dirtiness. The caliber of this application varies from 2 to 24. Through the process called spreading or calendering, the temperature is kept between 160 and 200° C. with a speed from 30 to 60 m/min reaching a solid, transparent and bright mixture under the form of a film. This film produced by the dispersion through the transference by pressure is applied on the aramid substrate.

High density polyethylene substrate

It is incorporated 90 g of dispersion on a liner of the polyester type with a surface treated with mold release in order to be presented completely flat and with no form of dirtiness. The caliber of this application varies from 2 to 24. Through the process called spreading or calendering, the temperature is kept between 160 and 200° C. with a speed from 30 to 60 m/min reaching a solid, transparent and bright mixture under the form of a film. This film produced by the dispersion through the transference by pressure is applied on the high density polyethylene substrate.

For sure when the current invention is put into practice, modifications may be introduced concerning certain details of construction and form, without implying keeping away from the fundamental principles which are clearly substantiated in the set of claims, being understood that the terminology used was not intended for limitation.

The invention claimed is:

1. A method of producing an adhesive comprising:
preparing a dispersion of a homopolymer of vinyl chloride and a plasticizer,
  wherein the plasticizer is a biodegradable, non-toxic polyaryilic glycolic triester plasticizer,
  wherein the dispersion includes a high content of free hydroxyl,
  wherein the dispersion comprises:
(i) a PVC homopolymer with K in the range from 65 to 75;
(ii) an ethoxylate fatty alcohol having from 10 to 40 mols;
(iii) an ecologic plasticizer; and
(iv) a stabilizer;
adding an anti-static;
enabling the dispersion to reach a certain content of free hydroxyl by addition of an ethoxylate fatty alcohol surfactant; and
maintaining pH in the range of 6 of 8 to obtain a homogenous dispersion,
wherein the stabilizer reaches an HLB of 8-10,
wherein the dispersion produces an extreme adherence over a plurality of polymeric and non-polymeric substrates.

2. The method according to claim 1, wherein the dispersion comprises from 25 to 35 parts of the PVC homopolymer.

3. The method according to claim 1, wherein the dispersion comprises from 50 to 50 parts of the ethoxylate fatty alcohol.

4. The method according to claim 1, wherein the dispersion comprises from 10 to 20 parts of the plasticizer.

5. The method according to claim 1, wherein the dispersion comprises from 1 to 2 parts of the stabilizer.

6. The method according to claim 1, wherein the preparation of the dispersion further comprises incorporating the plasticizer on the homopolymer.

7. The method according to claim 5, wherein the dispersion is configured for application on a plurality of substrates selected from the group consisting of: vinyl laminates, polyester substrate, low/high grammage paper substrate, natural cloth or mixed fiber substrate, polyethylene substrate, polypropylene substrate, aramid substrate and high density polyethylene substrate.

8. The method according to claim 1, wherein the homopolymer of vinyl chloride has a high molecular weight.

* * * * *